(12) United States Patent
Osborne

(10) Patent No.: US 10,662,952 B2
(45) Date of Patent: May 26, 2020

(54) LOW PROFILE PUMP MOTOR LEAD PROTECTOR

(71) Applicant: Lawrence Osborne, Acton, CA (US)

(72) Inventor: Lawrence Osborne, Acton, CA (US)

(*) Notice: Subject to any disclaimer, the term of this patent is extended or adjusted under 35 U.S.C. 154(b) by 0 days.

(21) Appl. No.: 16/416,578

(22) Filed: May 20, 2019

(65) Prior Publication Data

US 2019/0271321 A1 Sep. 5, 2019

Related U.S. Application Data

(63) Continuation of application No. 15/651,704, filed on Jul. 17, 2017, now Pat. No. 10,323,643, which is a continuation of application No. 15/165,078, filed on May 26, 2016, now Pat. No. 9,742,241, which is a continuation of application No. 14/266,994, filed on May 1, 2014, now Pat. No. 9,356,484.

(60) Provisional application No. 61/883,347, filed on Sep. 27, 2013.

(51) Int. Cl.
| | |
|---|---|
| *F04D 13/06* | (2006.01) |
| *H02K 5/132* | (2006.01) |
| *H02K 5/22* | (2006.01) |
| *F04D 13/10* | (2006.01) |
| *H02K 3/38* | (2006.01) |

(52) U.S. Cl.
CPC ......... *F04D 13/0693* (2013.01); *F04D 13/10* (2013.01); *H02K 5/132* (2013.01); *H02K 5/225* (2013.01); *H02K 3/38* (2013.01); *Y10T 29/49227* (2015.01)

(58) Field of Classification Search
CPC ...... F04D 13/0693; F04D 13/08; F04D 13/10; H02K 5/132; H02K 5/225
See application file for complete search history.

(56) References Cited

U.S. PATENT DOCUMENTS

| | | | | |
|---|---|---|---|---|
| 2,002,915 A | * | 5/1935 | Mendenhall | H02K 5/132 310/87 |
| 2,233,890 A | * | 3/1941 | Hoover | E21B 17/026 174/8 |
| 2,722,892 A | * | 11/1955 | French | F04D 13/10 417/423.3 |
| 4,019,836 A | * | 4/1977 | Deters | F04D 13/10 417/360 |
| 4,128,735 A | * | 12/1978 | Zehren | H02K 5/225 174/23 R |
| 4,536,138 A | * | 8/1985 | Romand-Monnier | F04D 13/10 417/422 |
| 5,038,965 A | | 8/1991 | Cater | |
| 5,863,124 A | | 1/1999 | Ouchi et al. | |

(Continued)

FOREIGN PATENT DOCUMENTS

CN 202612126 U 12/2012

*Primary Examiner* — Peter J Bertheaud
(74) *Attorney, Agent, or Firm* — Paul D. Chancellor; Ocean Law

(57) ABSTRACT

A low profile pump motor lead protector with a head guard and a trailing guard, the head guard including a front section with a front end and a rear section with a rear end, the trailing guard having a pin end for insertion in a head guard socket, the lead protector for protecting a motor lead of a pump and motor assembly of a downhole production string for surfacing fluid from a reservoir such as a subterranean oil well.

10 Claims, 4 Drawing Sheets

(56) References Cited

U.S. PATENT DOCUMENTS

| | | | | |
|---|---|---|---|---|
| 6,409,485 B1 * | 6/2002 | Ebner | ............... | E21B 17/028 |
| | | | | 310/87 |
| 6,666,664 B2 * | 12/2003 | Gross | ............... | E21B 43/128 |
| | | | | 166/105 |
| 7,443,067 B2 * | 10/2008 | Schlosser | ............ | F04D 13/10 |
| | | | | 174/66 |
| 7,611,339 B2 * | 11/2009 | Tetzlaff | ............ | E21B 43/128 |
| | | | | 417/422 |
| 7,666,013 B1 * | 2/2010 | Kopecky | ............ | F04D 13/10 |
| | | | | 417/423.3 |
| 8,827,666 B2 * | 9/2014 | Pedrollo | ............ | F04D 13/08 |
| | | | | 417/423.14 |
| 9,356,484 B2 * | 5/2016 | Osborne | ............ | H02K 5/132 |
| 9,709,043 B2 * | 7/2017 | Gilmore | ............ | H02K 5/132 |
| 9,742,241 B2 * | 8/2017 | Osborne | ............ | H02K 5/132 |
| 10,323,643 B2 * | 6/2019 | Osborne | ............ | H02K 5/132 |
| 2008/0041477 A1 | 2/2008 | Shotter et al. | | |
| 2010/0047089 A1 | 2/2010 | Booker et al. | | |
| 2012/0070319 A1 | 3/2012 | Pedrollo | | |

* cited by examiner

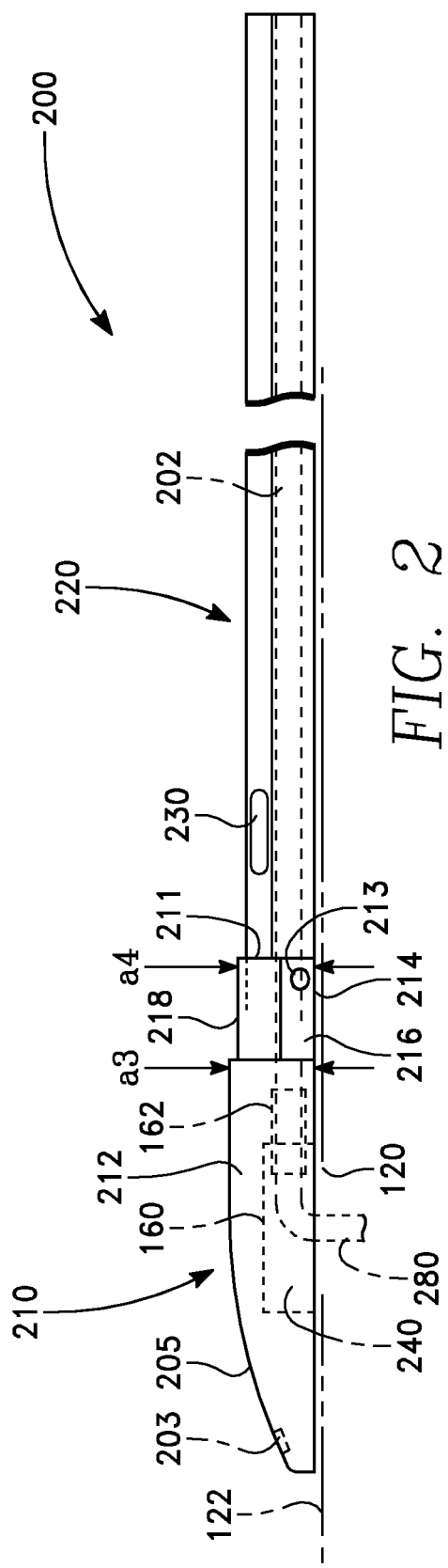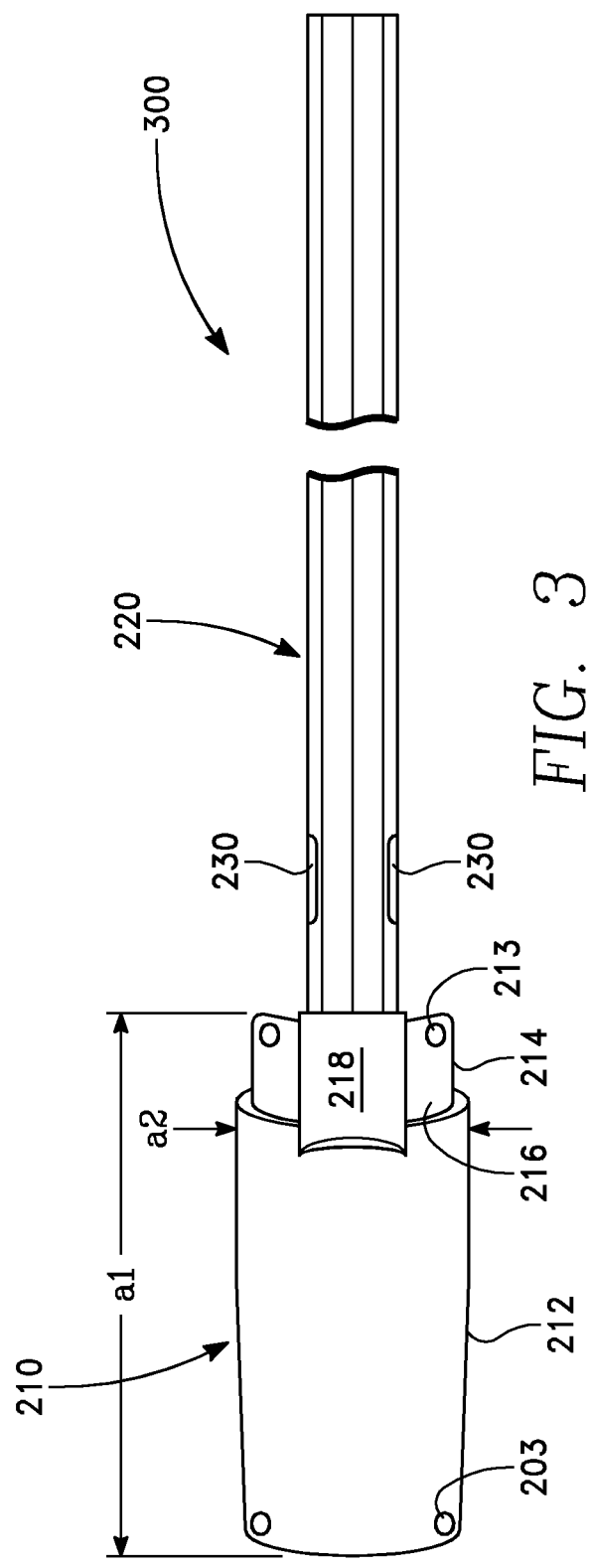

LOW PROFILE PUMP MOTOR LEAD PROTECTOR

PRIORITY CLAIM AND INCORPORATION BY REFERENCE

This application is a continuation of U.S. Non-Provisional patent application Ser. No. 15/651,704 filed Jul. 17, 2017 which is a continuation of U.S. Non-Provisional patent application Ser. No. 15/165,078 filed May 26, 2016 now U.S. Pat. No. 9,742,241 which is a continuation of U.S. Non-Provisional patent application Ser. No. 14/266,994 filed May 1, 2014 titled LOW PROFILE PUMP MOTOR LEAD PROTECTOR now U.S. Pat. No. 9,356,484 and claims priority to U.S. Provisional Patent Application No. 61/883,347 filed Sep. 27, 2013 titled PUMP MOTOR LEAD PROTECTOR which is incorporated herein, by reference, in its entirety and for all purposes. U.S. Pat. No. 6,863,124 B2 filed Dec. 17, 2002 is incorporated herein, by reference, in its entirety and for all purposes.

BACKGROUND OF THE INVENTION

Field of the Invention

The present invention relates to the mechanical arts. In particular, the invention relates to a manufacture incorporating structural parts for covering and protecting electrical leads connected to a pump motor in a downhole pumping apparatus.

Discussion of the Related Art

Electric motor driven pumps may be used in severe service locations such as those at depth in downhole oilfield applications. For example, such an apparatus may be used to return oil to the surface. Electrical and other leads that attach to the pump and its motor typically follow a string of pipe from the downhole location to a "topside" location at or near the earth's surface. Means to protect these leads from damage during installation, use and recovery of the pump have advanced little during recent years, perhaps due to the industry's reluctance to rely on new and arguably unproven equipment.

SUMMARY OF THE INVENTION

The present invention discloses a low profile pump motor lead protector. In various embodiments, the protector covers leads from a pump motor such as leads for one or more of electric power, electric telemetry, optical telemetry, fluid, pressurized fluid, and other similarly useful leads.

In an embodiment, a lead protector is for use with a downhole pump and motor in an oil production string comprising: a head guard and a trailing guard; the head guard covering a head end of a lead; the trailing guard covering a portion of the lead trailing from the lead head end; and, the head guard and the trailing guard configured to substantially cover the lead as it passes through a space between a production string casing and the pump and motor.

In various embodiments, the protector includes a head portion and a trailing portion either or both of which may be made of one or several parts. For example, some embodiments utilize one part head portion and a multipart trailing portion.

In various embodiments, a head guard and a trailing guard provide a means for continuously protecting a lead such as an electric power, electric signal, or other lead from the pump and motor. In an embodiment, the protector is configured to guard at least an electric power lead from a pump motor used downhole in an oil production string.

In various embodiments, the lead protector is mounted to a pump and motor apparatus. The head guard covers a penetration/terminal of the pump and motor apparatus where electric and/or other leads to be protected exit the pump and motor apparatus. In various embodiments, the head guard is made from metal such as stainless steel and has a clam-shell like construction providing a void on its bottom side to receive the abovementioned lead(s). And, in various embodiments, the head guard is configured to mate with the trailing guard to provide protection of a continuous or substantially continuous length of the lead(s).

And, in various embodiments, the trailing guard has a channel like shape with opposed sides and a web therebetween. And, in various embodiments, the trailing guard is made from a metal such as stainless steel. Some embodiments of the protector utilize several mated trailing guards such as overlapping trailing guards.

In an example, the pump and motor apparatus is surrounded by a casing such that a small annular like clearance is formed between the pump and motor apparatus and the surrounding casing. Here, the protector shields the lead(s) against physical damage that might result from the lead(s) touching the casing or other objects within the annulus.

With various embodiments of the pump and motor apparatus and insertion of the pump and motor apparatus in particular wells or well casings, there are particular dimensions such that different production strings have different dimensions which call for appropriate pump and motor apparatus to accommodate physical dimensions and quantities of product/oil to be produced.

In an exemplary operation, the lead protector provides a lead cover affixed to a pump and motor apparatus via a band like clamping system. During insertion of the pump and motor apparatus in a surrounding such as a casing, during operation of the pump and motor apparatus, and during extraction of the pump and motor apparatus from a surrounding such as a casing, the lead protector shields the covered lead(s) from damage such as damage caused by rubbing, pulling, scraping, and the like. Embodiments of the invention provide a lead protector of a length that protects from damage occurring in the annulus between a casing and the pump and motor apparatus.

In an embodiment, a method of using a low profile lead protector to prevent damage to an electrical lead of a pump motor during insertion, operation, and removal of an electric submersible pump assembly in an oil well casing comprising: providing a head guard including a front section with a front end and a rear section with a rear end, the head guard front section tapering toward the head guard front end and defining a ventral curved surface for mating with a pump motor exterior and defining a dorsal surface in the shape of a truncated triangle, and including bolt holes in opposite corners of and passing through the ventral curved surface; providing a head guard rear section that is depressed with respect to the front guard section, the head guard rear section defining a ventral curved surface for mating with a pump motor exterior and including a socket flanked by flanges with bolt holes; providing a trailing guard having an "n" shaped cross-section with six sides, two of the six sides being opposed and having aligned slots, the trailing guard secured at one end by the head guard rear section; on a production string, placing the trailing guard over a section of the pump motor lead and placing the head guard over the pump motor lead where it joins the motor and over an end portion of the trailing guard; on the production string, bolting the head guard to the pump motor; on the production string, banding the trailing guard to the pump and motor assembly; during insertion of the production string, the lead protector moving relative to the casing and the lead protector and fending off stationery obstructions to protect the pump motor lead; during operation of the production string, the lead protector shielding the pump motor lead from contact with the casing and objects in an annulus between the casing and the pump motor to protect the pump motor lead; and, during extraction of the production string, the lead protector moving relative to the casing and the lead protector and fending off stationery obstructions to protect the pump motor lead.

BRIEF DESCRIPTION OF THE DRAWINGS

The present invention is described with reference to the accompanying figures. In the figures, like reference numbers indicate identical or functionally similar elements. The accompanying figures, which are incorporated herein and form part of the specification, illustrate the present invention and, together with the description, further serve to explain the principles of the invention and to enable a person skilled in the relevant art to make and use the invention.

FIGS. 1-3 show a motor lead protector in accordance with the present invention.

DETAILED DESCRIPTION OF THE INVENTION

The disclosure provided in the following pages describes examples of some embodiments of the invention. The designs, figures, and description are non-limiting examples of embodiments they disclose. For example, other embodiments of the disclosed device and/or method may or may not include the features described herein. Moreover, disclosed advantages and benefits may apply to only certain embodiments of the invention and should not be used to limit the disclosed invention.

Unless otherwise indicated, parts that are connected or coupled may be directly or indirectly connected and may have other devices interposed therebetween including devices known to persons of ordinary skill in the art.

Figure 1:
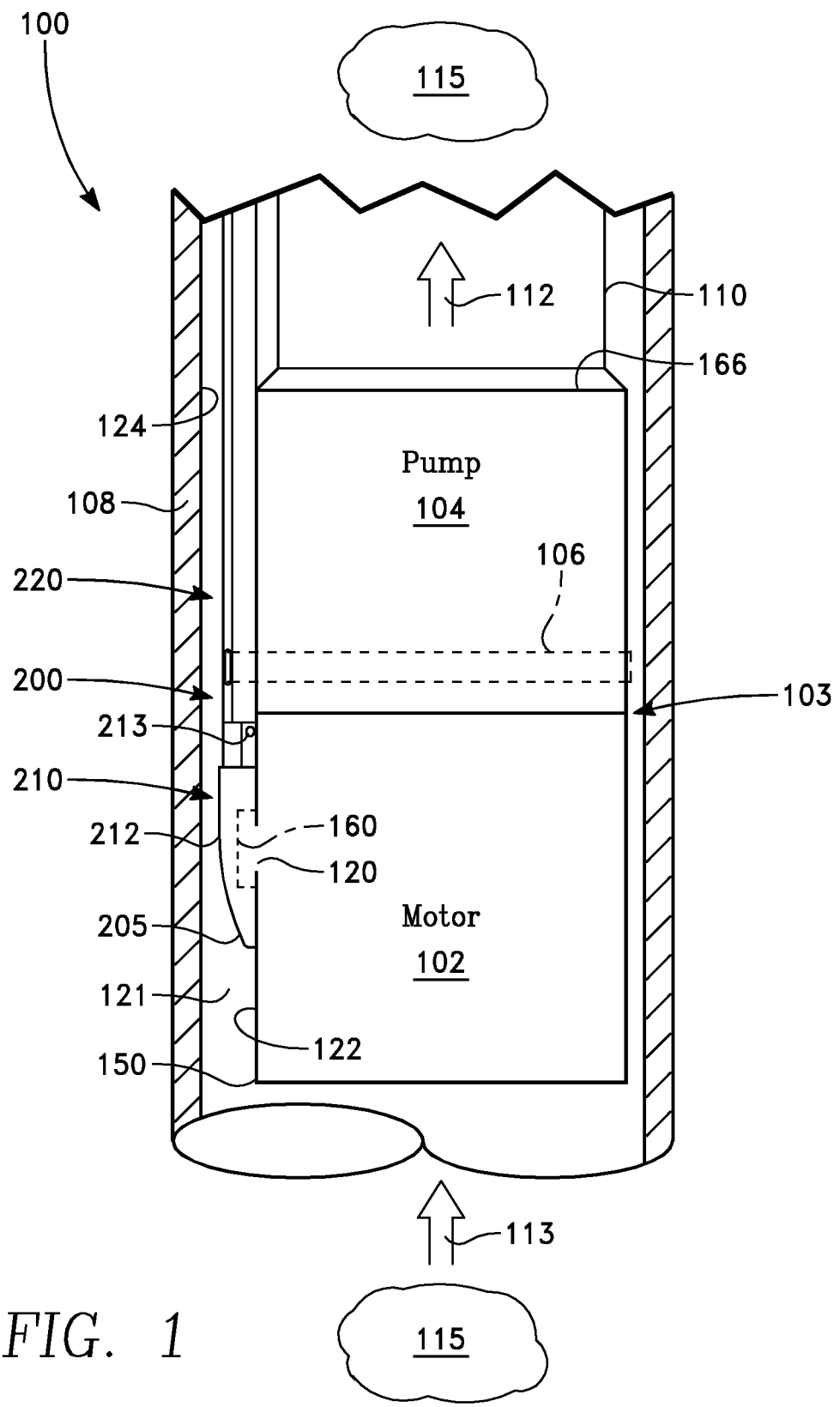

FIGS. 1-3 show views of a pump motor lead protector in accordance with the present invention 100, 200, 300. A pump motor lead is omitted from FIGS. 1, 3 for clarity and is shown in FIG. 2 (See e.g., 202).

FIG. 1 shows a pump motor lead protector 200 mounted alongside a pump 104 and motor 102 assembly 103 that may be suspended from production tubing 110 for producing product from a reservoir, such as a subterranean oil well and/or reservoir 113 to a receiving facility 115, such as a production shut-off valve. Flow arrows showing inlet flow from the reservoir and pump outlet flow 112 indicate typical production of liquids such as oil or crude oil. In various embodiments, the pump and motor assembly is an electric submersible pump and motor assembly.

Applications include production facilities with an outer casing such as casing 108 into which the pump 104 and motor 102 are inserted. As skilled artisans will recognize, the pump and motor assembly may also be used in a hole or well-bore that has no casing. And, as skilled artisans will recognize, the pump may be above the motor as shown, or the pump may be below the motor when designed for such use. An upper end of the pump 166 may, in various embodiments, be coupled with a string of production tubing 110.

When the pump and motor are moved in a confined space like the casing 108, the motor lead protector 200 assists in protecting the motor lead 202. For example, the motor lead protector covers the motor lead (See FIG. 2) such that it is not rubbed against or snagged by adjacent and/or fixed structures such as the casing inside side wall 124 during pump 104 and motor 102 insertion into or removal from the casing.

A head guard of the motor lead protector 210 covers the motor lead 202 where it passes through a motor sidewall 122. Some embodiments of the head guard include a head guard front or head guard front section 212 with a forward sloped or wedge-like nose 205 that guides pump 104 and motor 102 when moved in the casing. Locating the motor lead protector and in particular the head guard front section between the motor and the inside side wall of the casing 124 spaces the motor apart from the casing 121.

In various embodiments, connection of the pump motor lead protector 200 with the motor 102, pump 104, and production tubing 110 is by fasteners and/or other restraints. For example, bolts may be used to affix the head guard 210 to the motor and straps or bands 106 may be used to affix the trailing guard 220 to the motor, pump and/or production tubing. As skilled artisans will recognize, embodiments provide a motor lead protector that extends at least from a motor lead entryway 120, and in the direction of the receiving facility 115.

FIG. 2 shows an enlarged side view of the motor lead protector of FIG. 1. Among other things, this view shows a motor lead 202 that is covered by the motor lead protector. And, FIG. 3 shows an enlarged top view of the motor lead protector of FIG. 1.

The motor lead protector 200 includes the head guard 210 and the trailing guard 220. The head guard includes a head guard front section 212 and a head guard rear section 214. Like the trailing guard 220, the head guard 210 provides motor lead 202 protection. For example, a hollowed out head guard provides a protected space for a motor lead 202 which has an exemplary motor lead head end 203. Here, the motor lead head end is shown entering the motor lead entryway 120 through the motor entryway sidewall 122.

In some embodiments, the motor lead 202 connects with a lead termination block 160 such as an electrical terminal block or receptacle that is accessible on the motor exterior. And in some embodiments, a motor lead plug 162 interconnects with a mating lead termination block, for example a bayonet plug and socket or another suitable arrangement may be used. The terminal block may extend from a sunken motor surface portion providing a low profile motor terminal block. In various ones of these embodiments, the motor lead need not pass through a motor lead entryway, a feature that may enable better sealing of the motor internals against contaminants outside the motor.

In various embodiments, head guard 210 features include the head guard front 212 section with a hollowed out interior 240 for receiving a motor lead 202, and motor fastener means such as peripheral bolt holes 205. In some embodiments bolts passing through front guard peripheral bolt holes are anchored in matched threaded holes of the motor. For example, bolt holes in a motor used to mount a traditional motor lead entryway cover might be reused when the front guard replaces the traditional cover during pump motor lead protector installation.

And, in various embodiments, head guard features include a head guard rear section 214 with a box 218 extending from the front section and peripheral or flanged fastening means 216 to either side of the box. The box may be in the form of a closed box or a box with an open side(s). In some embodiments, the box is a rectangle with an open side or side portion adapted to receive the cross-sectional shape of a mating end (See e.g. 410) of the trailing guard 220. And, in some embodiments the box is adapted to fit and/or fittingly receive the cross-sectional shape of a mating end of the trailing guard as where the box and the mating end have equal numbers of sides. Fastener means such as bolt holes 213 may be used with peripheral or flanged fastening means.

FIG. 3 shows, inter alia, a dorsal top side 219 of the head guard 210. Dimensions include an overall length "a1" and a width such as a maximum width of "a2." FIG. 2 shows, inter alia, a side view of the head guard with a head guard front section 212 height of "a3" which is less than a head guard rear section 214 height of "a4". In various embodiments, a head guard major aspect ratio is (a1/a2) with values greater than two. And, in various embodiments, the head guard rear section with height a4 is depressed with respect to the adjacent head guard front section with height a3.

And, in some embodiments a head guard minor aspect ratio is (a1/a3) with values greater than four. In these embodiments, the lead protector head guard may be described as a "low profile" lead protector.

Figure 4:
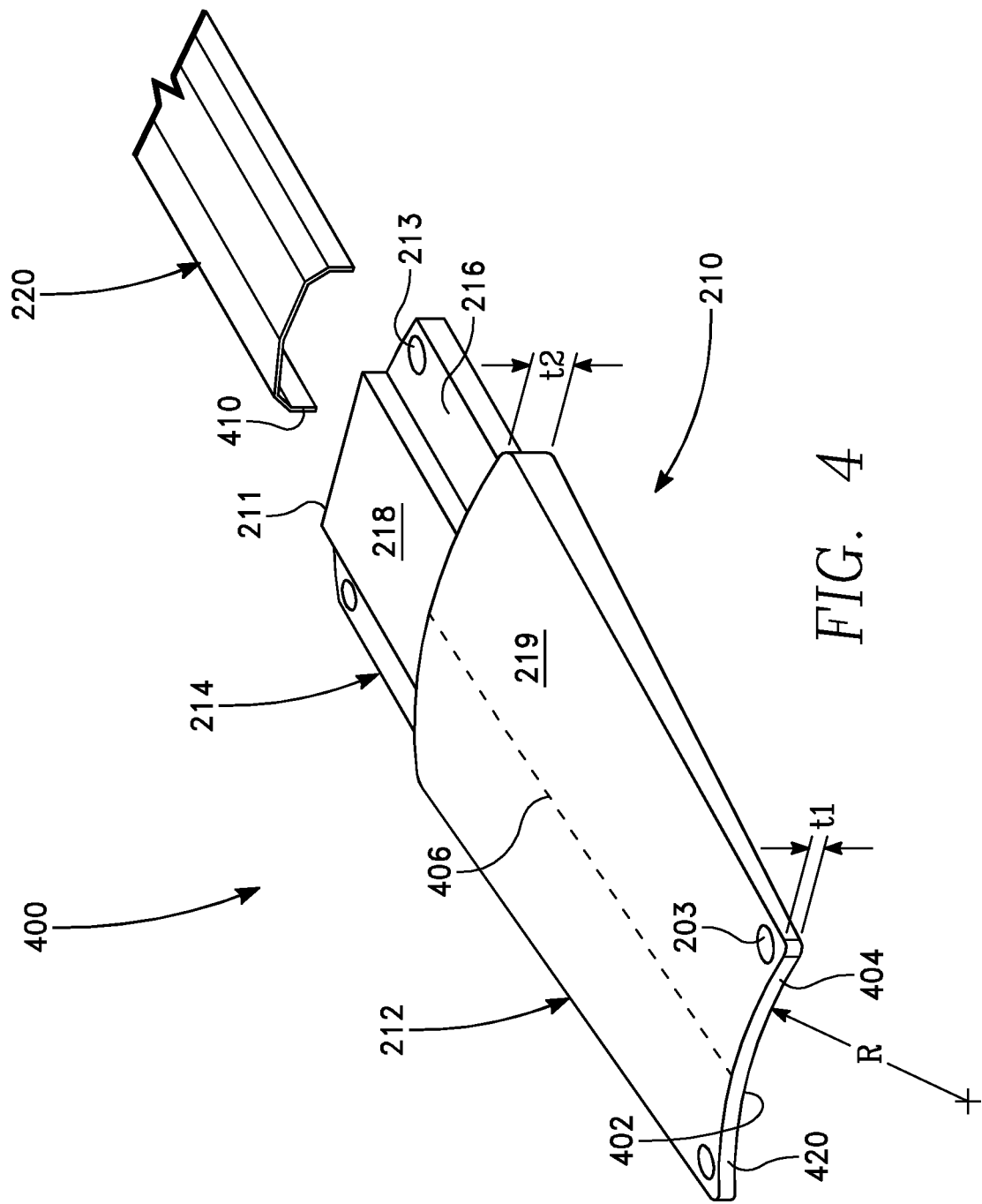
FIG. 4 shows an embodiment of a head guard that is a part of the motor lead protector of FIG. 1.

FIG. 4 shows an enlarged perspective view 400 of an embodiment of the head guard of FIG. 2. As seen, the head guard 210 is ready for mating with an adjacent trailing guard portion 220. In an embodiment, a head guard box 218 includes a box mouth 211 that is for receiving a free end 410 of the trailing guard assembly. Skilled artisans will appreciate this "pin and socket" joint arrangement might be reversed in some embodiments.

Also shown is a head guard 210 end 404 revealing a curved interior or curved ventral surface portion 402 of the head guard. Curved with a radius "R," the head guard may be designed to snugly interface with a similarly curved motor 102 exterior surface 150. Other portions of the head guard such as the head guard rear section 214 may be similarly shaped for similar reasons.

The embodiment shown has a head guard front 212 with a wedge-like forward slope along its longitudinal axis (e.g., t1<t2). In some embodiments, the head guard front section has a raised exterior rib 406 that extends about parallel to a head guard longitudinal axis. And, in an embodiment, a dorsal rib such as a bumper rib or a central bumper rib that extends along at least a portion of the head guard and in a direction that is somewhat parallel to the head guard longitudinal axis.

As skilled artisans will appreciate, head guards with a wedge-like forward slope provide means to reduce the leading cross-sectional area 420 and thickness t2, attributes lowering the risk of frontal impacts with fixed structures that may tend to move the head guard relative to the motor 102. Where the rib is included, otherwise deleterious effects of side impacts and friction with the head guard and the casing inside sidewall 124 may be further reduced.

Turning now to consider the trailing guard 220, the head guard 210 is for assembly with the trailing guard 220. Some head guard embodiments provide for a box-like connection wherein a trailing guard 220 is mated with and/or inserted in a box mouth 211 of a head guard box 218.

In various embodiments, the trailing guard is in the form of a tube, partial tube, or channel-like structure 220 and corresponding slots 230 in opposite sidewalls of the trailing guard provide a means for strapping or banding 106 the trailing guard to secure it against one or more of the pump, motor, and production tubing (See also FIG. 1). In an embodiment, bands secure the trailing guard to at least one of the pump 104 and the motor 102. And, in an embodiment, bands secure the trailing guard to the pump and the motor. And, in an embodiment bands securing the trailing guard include bands that encircle the production tubing 110.

Figure 5:
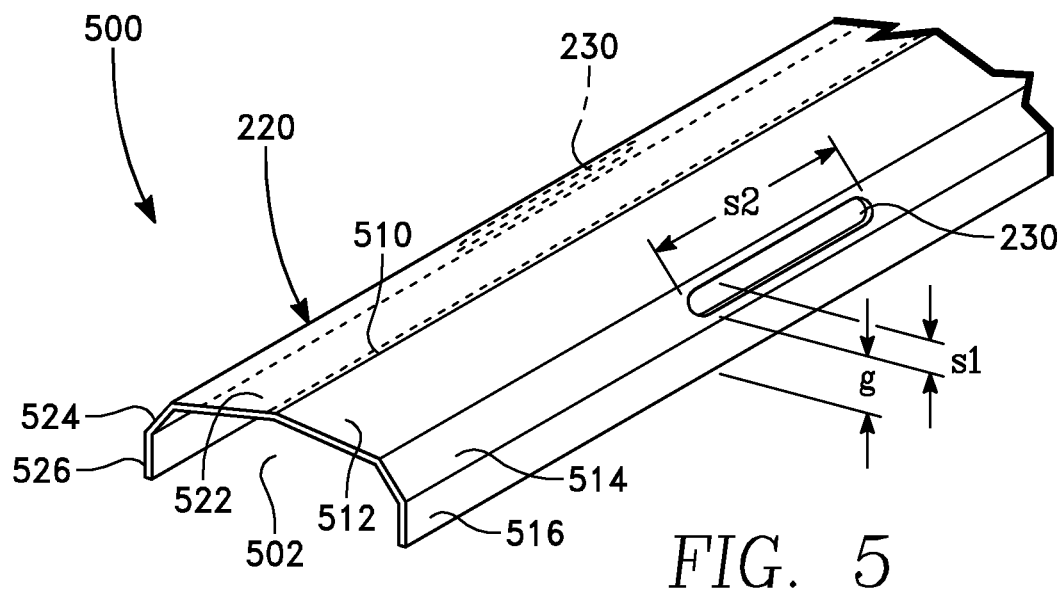
FIGS. 5-7 show an embodiment of a trailing guard that is a part of the motor lead protector of FIG. 1.
Figure 6:
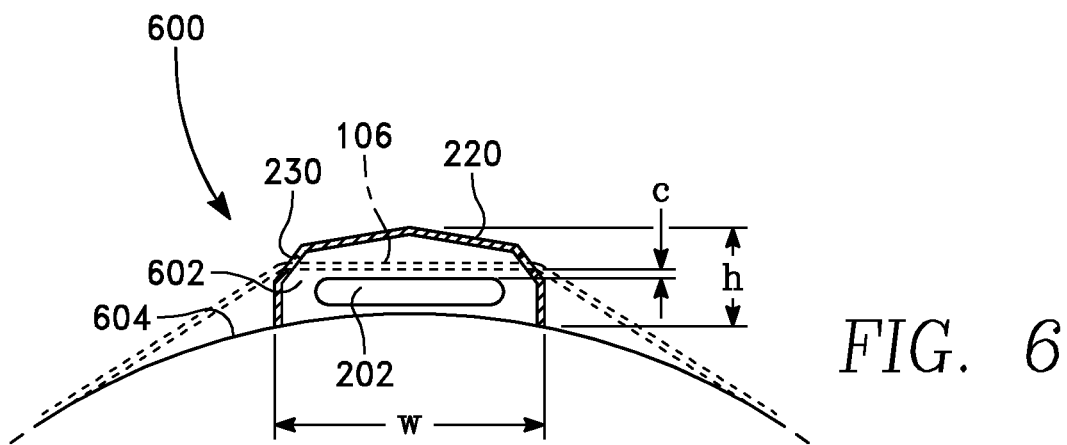
Figure 7:
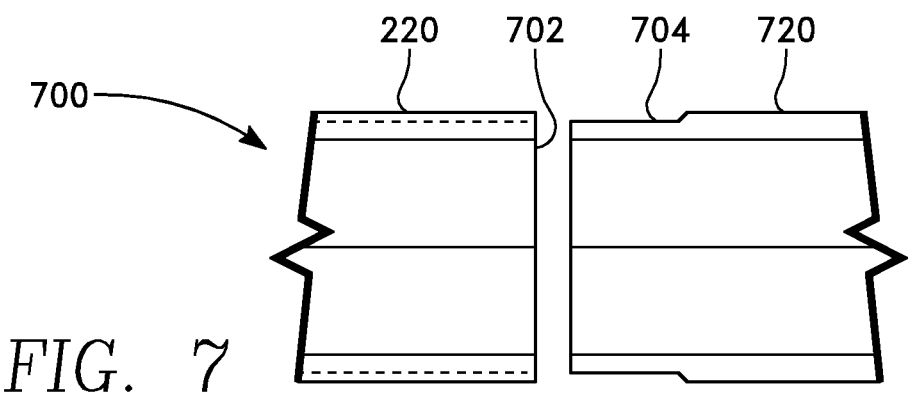

FIGS. 5-7 show an embodiment 500, 600, 700 of the trailing guard 220 of FIG. 2.

In various embodiments, including the embodiment of FIG. 5, the channel may be described as having multiple sides, for example 7 sides, one of which 502 is open. Here, a channel ridgeline 510 is the juncture of first sidewalls 512, 522 forming a somewhat flattened "A" frame like structure. Adjoining respective legs of the "A" as first leg extensions are second sidewalls 514, 524 forming an obtuse angle with respective first sidewalls. Adjoining these first leg extensions are second leg extensions/third sidewalls 516, 526 forming near right angles with respective first sidewalls.

Some trailing guard cross-sections may be referred to as "n" shaped cross-sections, more particularly as four or more adjoining panels forming an "n" shaped cross-section and yet more particularly as 6 adjoining panels forming an "n" shaped cross-section.

FIG. 6 shows the channel 220 cross-section of FIG. 5. A channel overall height "h" and a channel overall width "w" are shown along with a channel interior 602. The channel open side 502 faces an adjacent structure 604 such as the motor 102, pump 104, or production tubing 110.

In various embodiments a strap or band 106 and a motor lead 202 pass through the channel interior via corresponding channel slots 230 with exemplary major "s2" and minor "t2" slot dimensions selected to accommodate the band. Here, a motor lead 202 is located beneath the band such that a protective clearance "c" exists between the strap or band and the motor lead. A benefit of the protective clearance is relieving the motor lead as a strap or band bearing point and using the channel instead to transmit forces to the structure via its two leg extensions 516, 526 without bearing on the motor lead. Yet another benefit of the protective clearance is the avoidance/mitigation of strap or band to motor lead chafing.

FIG. 7 shows mating ends 702, 704 of respective trailing guards depicted as channel sections 220, 720. As shown here, the pin like end 704 of one trailing guard 720 is for insertion into the socket-like end 702 of another trailing guard 220. As skilled artisans will appreciate, trailing guard mating ends may be configured as needed to accommodate varying trailing guard cross sections. And, as skilled artisans will appreciate, trailing guard sections with mating ends provide a means of adapting trailing guard length to accommodate varying applications.

Materials of construction for the head guard 210 include metals and dense plastics. For example, a metal such as stainless steel and a plastic such as polyether ethyl ketone ("PEEK"), known for its toughness and low coefficient of friction, might be used according to the application. As indicated by the choice of application, materials, cost, schedule, and availability, head guards may be machined, cast, or produced by other suitable methods such as powder metallurgy or sintering. In an embodiment, the head guard is made from stainless steel.

Materials of construction for the trailing guard 220 include metals and dense plastics. For example, a metal such as stainless steel and a plastics such as polycarbonate and polypropylene might be used according to the application. As indicated by the choice of application, materials, cost, schedule, and availability, trailing guards may be machined, cast, extruded, rolled, or produced by other suitable methods such as powder metallurgy or sintering. In an embodiment, the trailing guard is made from stainless steel.

In operation, embodiments of the lead protector provide a lead cover affixed to a pump and motor assembly, for example via a band like clamping system. For example, protection is provided during insertion of the pump and motor apparatus in a surrounding such as a casing, during operation of the pump and motor apparatus, and during extraction of the pump and motor apparatus from a surrounding such as a casing. The lead protector shields the covered lead(s) from damage such as damage caused by rubbing, pulling, scraping, and the like. Among other things, embodiments of the invention provide a lead protector of a length that protects the motor lead from damage occurring in the annulus between a casing and the pump and motor apparatus.

Example: In an oil well application with a well casing, the pump motor lead protector was installed on a 3.75 inch outside diameter pump and motor assembly. The head guard was dimensioned to fit within the annulus between the motor and the casing inside wall. As described above, a wedge-like front guard and a mating trailing guard with slotted sidewalls was installed via metal bands passing through the slots and around the pump and motor assembly. Bolts passing through front guard peripheral bolt holes and anchored in matched threaded holes of the motor secured the head guard to the motor. Channel cross-section, channel slot locations, and motor lead dimensions provided a protective clearance between the motor lead and banding passing through the channel interior. The assembly was inserted in the casing and lowered 1100 feet into the reservoir for fluid production. During lowering, the assembly navigated the route through the casing, including casing bend radii on the order of 3 to 4 degrees. In operation, the pump and motor surfaced fluid normally. This evidence shows the pump motor lead protector prevented debilitating rubbing and snagging damage to the motor lead and further that the protective clearance prevented debilitating rubbing, chafing, and compression damage between the band and the motor lead.

While various embodiments of the present invention have been described above, it should be understood that they have been presented by way of example only, and not limitation. It will be understood by those skilled in the art that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. Oil well production equipment including a downhole production string and a pump motor lead protector comprising:
    a receiving facility interconnected with the production string;
    the production string including a pumping unit and tubing inserted in a casing;
    the pumping unit including a pump and a pump motor for pumping oil through the tubing;
    a pump motor lead for supplying electrical power to the pump motor;
    a head guard and a trailing guard for protecting the pump motor lead in an annulus between the casing and the pumping unit which is a smaller annulus than an annulus between the casing and the tubing;
    a head guard tapered end opposite a head guard mouth and an interior space of the head guard for receiving the pump motor lead;
    the trailing guard for joining with the head guard at the mouth and for receiving the pump motor lead from the head guard and for covering the pump motor lead alongside the pumping unit; and,
    a band for encircling the production string such that the band passes through opposed sidewall slots of the trailing guard to fix the trailing guard to the production string.

2. The equipment of claim 1 wherein the head guard receives the pump motor lead from an exit in a side of the pump motor.

3. The equipment of claim 2 wherein the tubing is attached to a pump outlet.

4. The equipment of claim 2 wherein the head guard mouth is a box mouth.

5. The equipment of claim 2 wherein the trailing guard has an open cross section.

6. The equipment of claim 1 further comprising:
    within a trailing guard interior, the pump motor lead is between the band and an assembled pump and pump motor; and,
    within the trailing guard interior, a protective clearance is between the band and the motor lead;
    wherein the protective clearance protects the pump motor lead from damaging contact with the band.

7. A method for protecting oil well production equipment including a downhole production string and a pump motor lead protector:
    providing a receiving facility interconnected with the production string that includes a pumping unit and tubing inserted in a casing, the pumping unit including a pump and a pump motor for pumping oil through the tubing;
    supplying the pump motor with electric power via a pump motor lead;
    protecting the pump motor lead with a head guard having a wedge-shaped nose and a trailing guard having an "n" shaped cross-section, the head guard and the trailing guard joined where the trailing guard is inserted in a mouth of the head guard;
    covering the pump motor lead with the head guard and the trailing guard to protect the pump motor lead in an annulus between the casing and the pumping unit that is smaller than an annulus between the casing and the tubing;
    encircling the production string with a band that passes through opposed sidewall slots of the trailing guard to fix the trailing guard to the production string.

8. The method of claim 7 wherein the head guard receives the pump motor lead from an exit in a side of the pump motor.

9. The method of claim 7 wherein the tubing is attached to a pump outlet.

10. The method of claim 7 further comprising the steps of:
    within a trailing guard interior, inserting the pump motor lead between the band and an assembled pump and pump motor; and, within the trailing guard interior, providing a protective clearance between the band and the motor lead;

wherein the protective clearance protects the pump motor lead from damaging contact with the band.

* * * * *